United States Patent [19]

Byron et al.

[11] Patent Number: 4,847,843
[45] Date of Patent: Jul. 11, 1989

[54] COLOR CENTER LASER FIBRE AND APPLICATIONS THEREOF

[75] Inventors: Kevin C. Byron, Bishop's Stortford; Michael G. Scott, Saffron Walden; Wilson Sibbett, St. Andrews, all of Great Britain

[73] Assignee: STC PLC, London, England

[21] Appl. No.: 150,763

[22] Filed: Feb. 1, 1988

[30] Foreign Application Priority Data

Feb. 12, 1987 [GB] United Kingdom ............ 8703254

[51] Int. Cl.$^4$ .................................. H01S 3/16
[52] U.S. Cl. ............................ 372/42; 372/6; 350/96.3; 350/96.34
[58] Field of Search .................... 372/6, 39, 42; 350/96.3, 96.34

[56] References Cited

U.S. PATENT DOCUMENTS 4,618,211  10/1986  Fleury .................. 350/96.34

FOREIGN PATENT DOCUMENTS 7912967  5/1979  France .
1015057  9/1962  United Kingdom .
2164032  3/1986  United Kingdom .

OTHER PUBLICATIONS

Recent Progress in Color Center Lasers, W. Gellerman et al., Laser Focus, vol. 18 (1982) Apr., pp. 71-75.
Low-OH-Absorption Fluoride Glass Infra-Red Optical Fibres, G. Maze et al., Electronics Letters 20 (1984) Oct., No. 2, pp. 884-885.
Infrared Fibres-an overview, B. Bendow et al., Optical Engineering 24 (1985) Nov.-Dec., No. 6, pp. 1072-1080.

Primary Examiner—William L. Sikes
Assistant Examiner—B. R. R. Holloway
Attorney, Agent, or Firm—Lee & Smith

[57] ABSTRACT

Optical fibres comprised of a halide glass incorporating color centers, for example fluoride fibres, can behave as a laser or an amplifier when maintained at a low temperature, typically 77° K., and optically pumped. A laser may be comprised by a length of such a fibre (1) wound on a spool (2) and disposed in liquid nitrogen (4), the ends of the fibre are outside of the coolant and associated with input and output mirrors (5,6) which define the extremities of a lasing cavity. An optical pumping signal (7) is provided by a laser (8), for example a Krypton ion laser operating in the visible range. The output of the fibre laser is in the infra-red. Higher gain than with conventional color center lasers is achieved due to the longer interaction length and cooling problems are overcome.

16 Claims, 1 Drawing Sheet

COLOR CENTER LASER FIBRE AND APPLICATIONS THEREOF

BACKGROUND OF THE INVENTION

This invention relates to lasers and amplifiers and in particular to fibre lasers and amplifiers and to colour centre lasers.

The active media of colour centre lasers are particular point defects in insulating crystals which introduce new allowed electronic transitions into the crystal's forbidden energy gap. This produces optical absorptions, and emissions, and therefore "colours" the normally transparent crystal.

In conventional colour centre lasers the active material is a cryogenically cooled single crystal slab. A stringent design of cryostat is required in order to maintain the crystal at the 77° K. operating temperature (liquid nitrogen). The crystal slab is disposed on a cold finger of the cryostat within an optical cavity and provided with means for optically pumping the crystal slab for laser operation. There are various practical problems with such arrangements, particularly alignment difficulties since light has to be directed through windows of the cryostat.

SUMMARY OF THE INVENTION

According to one aspect of the present invention there is provided an optical fibre comprised of a halide glass incorporating colour centres.

According to another aspect of the present invention there is provided an apparatus including a length of a halide glass optical fibre incorporating colour centres, means for cooling the fibre to a working temperature and means for coupling an optical pumping signal into an input end of the fibre.

According to a further aspect of the present invention there is provided a halide glass optical fibre incorporating colour centres which when maintained cooled to a working temperature and optically pumped by the output of a laser exhibits laser action.

According to still another aspect of the present invention there is provided a halide glass optical fibre incorporating colour centres which when cooled to a working temperature and optically pumped by the output of a laser serves to amplify an optical signal input thereto whose wavelength comprises the wavelength at which lasing of the halide glass optical fibre can be achieved.

BRIEF DESCRIPTION OF THE DRAWINGS

Embodiments of the invention will now be described with reference to the accompanying drawings, in which.

DESCRIPTION OF THE PREFERRED EMBODIMENTS

As mentioned above, conventional colour centre lasers employ a slab of single crystal material which may, for example, be an alkali halide crystal such as NaCl which is OH doped to provide the colour centres, OH doped NaF or LiF, or LiF irradiated to provide the colour centres.

Optical transmission systems presently employ silica based fibres. For use at longer wavelengths it has already been proposed to employ fluoride fibres rather than silica fibres. Fluoride fibres can be used at mid-IR wavelengths, up to 4 um, and theoretically have ultra-low losses. Optical sources for such fluoride fibres are thus required and the present invention proposes that they be provided by fluoride fibre, for example, in the form of a colour centre fibre laser.

Fibre lasers and amplifiers have previously been proposed in the form of rare-earth doped silica single-mode fibres, particularly neodymium doped silica fibre. Specific doping of the silica is, however, required.

Fluoride fibres currently of interest for low losses comprise zirconium fluoride, barium fluoride, lanthanum fluoride, aluminium fluoride, sodium fluoride, typically up to 20 mol % is an alkali halide. However, a large number of other halide glasses exist, for example those based on thorium fluoride or cadmium chloride.

It is considered that fibres based on a halide glass may inherently include colour centres and can thus be used as lasers or amplifiers simply by suitably optically pumping them. Alternatively, it may be necessary to introduce colour centres into halide glass fibres but this can simply be done by suitable irradiation of an existing halide glass fibre, in particular those containing alkali halides such as LiF, NaF, $MgF_2$. There is thus no need to produce specifically doped material from which to form fibre for colour centre fibre lasers or amplifiers; existing fibre can be treated to produce the colour centres therein. Thus when maintained at low temperatures, typically 77° K., and optically pumped such as by a laser, colour centres inherently in, or introduced in, halide glass, for example fluoride, fibres can exhibit laser action or behave as amplifying media.

Typically, halide (fluoride) fibres may be drawn from a core/cladding structure preform made by a melt and cast technique. Cladding material may be cast inside a mould which is rotating quickly in order to form a tube. Subsequently when the tube is stationary, core material is cast into it. For single mode fibre this preform may be sleeved in a second fluoride tube. Fibre is drawn from the preform in a conventional manner and may be irradiated, for example by gamma radiation, to produce the required colour centre laser fibre.

Figure 1:
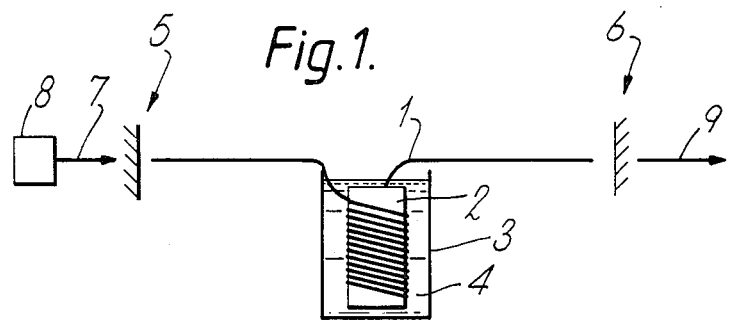
FIG. 1 illustrates schematically a colour centre fibre laser.

A length of such a single mode halide glass colour centre laser fibre 1 (FIG. 1) may be employed as a fibre laser by winding it on a spool 2 disposing the spool 2 and wound fibre 1 in a Dewar flask 3 containing liquid nitrogen 4. The two ends of the fibre length are arranged outside of the flask. Associated with each fibre end is a respective mirror 5 and 6. The fibres may abut the mirrors, be spaced closely thereto or be spaced further apart with the interposition of optical elements such as lenses. The mirrors define the lasing cavity extremities. The input mirror 5 is of high transmission with respect to the employed pump wavelength and high reflectance at the laser wavelength, whereas the output mirror 6 is of low reflectance at the laser wavelength. The pump signal 7 may be provided by an argon ion laser 8, by a Krypton ion laser operating in the visible part of the spectrum at 647.676 nm, or by a neodymium laser operating at 1.06 um. Optically pumping the laser fibre 1 results in laser action and an output 9 in the infra-red part of the spectrum. Tuning of the laser can be achieved disposing a grating, for example, together with a collimating lens in a conventional manner between the output mirror 6 and the associated end of the fibre.

Figure 2:
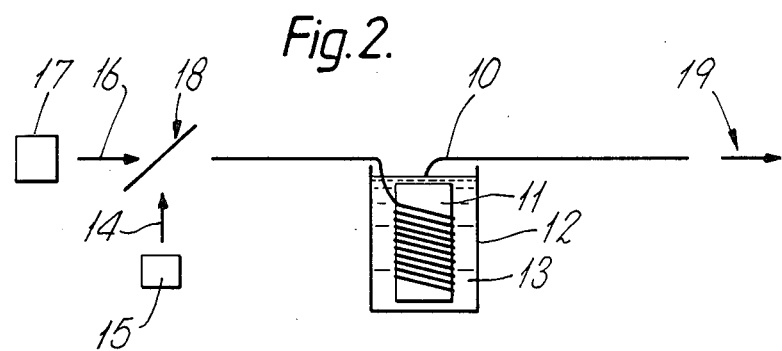
FIG. 2 illustrates schematically a colour centre fibre amplifier.

Alternatively a length of such a single-mode halide-glass colour-centre fibre 10 (FIG. 2) may be employed as a fibre amplifier by winding it on a spool 11 and disposing the spool 11 and wound fibre 10 in a Dewar flask 12 containing liquid nitrogen 13. The two ends of the length of fibre are arranged outside of the flask. An optical signal 14, which is to be amplified is output from means 15, which may comprise the end of a transmission path, and is coupled into one end of fibre 10 together with an optical pump signal 16 output from means 17 such as an argon or Krypton ion laser as before. The coupler 18 may alternatively comprise a fibre coupler. The optical signal 14 is at the lasing wavelength of the fibre. By injecting the signal 14, at the lasing wavelength, and the pump signal into the colour centre fibre 10 at one end thereof there is achieved an amplified output signal 19 at the lasing wavelength at the other end thereof.

Since a fibre of a colour centre material is being employed instead of a slab of material as before, there is a very much longer interaction length for the optical pump signal and higher gain is achievable. The long interaction length also means that a lower pump power may be employed. As mentioned above, when using a slab of material as before, cooling requires a complicated cryostat arrangement. Using a fibre, however, means that it may be simply coiled up, possibly on a spool as described above, and simply disposed in a flask of liquid nitrogen with its ends projecting therefrom. The cooling problems are therefore alleviated and alignment is facilitated between the optical signals and the lasing cavity input fibre end. Since the core diameter of the fibre is small there will be a high power density throughout the long interaction length. The laser structure employing such a colour centre laser fibre may be employed as a source for a mid-IR transmission system, for example, or for sensing systems. The fibre need not be single mode as specifically referred to above and may alternatively be multimode.

We claim:

1. A colour centre laser fibre including an optical fibre with a core of halide glass incorporating active colour centres along the entire fibre length whereby to achieve gain, within the core, of an optical signal input thereto, and the fibre being such as to confine the input optical signal within the fibre during its passage therethrough.

2. A colour centre laser fibre as claimed in claim 1 wherein the halide glass is a fluoride.

3. A colour centre laser fibre as claimed in claim 1 wherein the halide glass contains an alkali halide.

4. A colour centre laser comprised by a length of a colour centre laser fibre, a portion of which fibre intermediate its ends is disposed in liquid nitrogen, a respective mirror associated with each fibre end whereby to define a lasing cavity therebetween, an optical pumping signal source and means to couple the output of the optical pumping signal source into the lasing cavity.

5. A colour centre laser as claimed in claim 4 wherein the colour centre laser fibre is comprised by a halide glass fibre.

6. A colour centre laser as claimed in claim 5 wherein the halide glass is a fluoride.

7. A colour centre laser as claimed in claim 5 wherein the halide glass contains an alkali halide.

8. A colour centre laser as claimed in claim 4 wherein said optical pumping signal source is a laser.

9. A colour centre laser as claimed in claim 4 and including means for tuning the wavelength of the lasing cavity output.

10. A colour centre laser as claimed in claim 4 wherein the colour centre laser fibre is wound on a spool and immersed in the liquid nitrogen which is contained in a Dewar flask, the ends of the fibre being disposed outside of the flask.

11. An optical amplifier comprised by a length of colour centre laser fibre, a portion of which fibre intermediate its ends is disposed in liquid nitrogen, an optical pumping signal source, means to couple the output of the optical pumping signal source to an input end of the fibre, a source of a further optical signal, which further optical signal is to be amplified, the wavelength of which further optical signal comprises the lasing wavelength of the colour centre laser fibre, and means to couple the further optical signal output to said input end of the fibre, the optical signal output from the other end of the fibre comprising said further optical signal amplified.

12. An optical amplifier as claimed in claim 11 wherein the colour centre laser fibre is comprised by a halide glass fibre.

13. An optical amplifier as claimed in claim 12 wherein the halide glass is a fluoride.

14. An optical amplifier as claimed in claim 12 wherein the halide glass contains an alkali halide.

15. An optical amplifier as claimed in claim 11 wherein said optical pumping signal source is a laser.

16. An optical amplifier as claimed in claim 11 wherein the colour centre laser fibre is wound on a spool and immersed in the liquid nitrogen which is contained in a Dewar flask, the ends of the fibre being disposed outside of the flask.

* * * * *